US008601089B2

(12) United States Patent
Bowman et al.

(10) Patent No.: US 8,601,089 B2
(45) Date of Patent: Dec. 3, 2013

(54) MEDIA PLAY OF SELECTED PORTIONS OF AN EVENT

(75) Inventors: Robert A. Bowman, Westport, CT (US); John Dinn Mann, Newtown, PA (US); Justin Alexander Shaffer, New York, NY (US); Joseph Francis Choti, Stockton, NJ (US)

(73) Assignee: MLB Advanced Media, L.P., New York, NY (US)

( * ) Notice: Subject to any disclaimer, the term of this patent is extended or adjusted under 35 U.S.C. 154(b) by 1416 days.

(21) Appl. No.: 10/911,993

(22) Filed: Aug. 5, 2004

(65) Prior Publication Data

US 2006/0047774 A1   Mar. 2, 2006

(51) Int. Cl.
*G06F 15/16* (2006.01)

(52) U.S. Cl.
USPC ............... 709/217; 709/219; 725/61; 725/62; 725/86; 725/87; 725/111

(58) Field of Classification Search
USPC .......................................................... 709/217
See application file for complete search history.

(56) References Cited

U.S. PATENT DOCUMENTS

| | | | |
|---|---|---|---|
| 5,526,479 A * | 6/1996 | Barstow et al. ............... | 345/473 |
| 5,568,205 A | 10/1996 | Hurwitz | |
| 5,671,347 A | 9/1997 | Barstow et al. | |
| 6,005,611 A | 12/1999 | Gullichsen et al. | |
| 6,118,493 A | 9/2000 | Duhault et al. | |
| 6,144,375 A * | 11/2000 | Jain et al. ...................... | 715/251 |
| 6,154,771 A * | 11/2000 | Rangan et al. ................. | 709/217 |
| 6,204,862 B1 * | 3/2001 | Barstow et al. ............... | 345/473 |
| 6,492,997 B1 | 12/2002 | Gerba et al. | |
| 6,578,203 B1 | 6/2003 | Anderson, Jr. et al. | |
| 6,681,398 B1 | 1/2004 | Verna | |
| 6,795,638 B1 * | 9/2004 | Skelley, Jr. ....................... | 386/52 |
| 6,810,397 B1 * | 10/2004 | Qian et al. ..................... | 707/794 |
| 7,010,492 B1 | 3/2006 | Bassett et al. | |
| 7,823,066 B1 * | 10/2010 | Kuramura ...................... | 715/717 |
| 2003/0189589 A1 * | 10/2003 | LeBlanc et al. ............... | 345/723 |
| 2004/0055017 A1 * | 3/2004 | Delpuch et al. ............... | 725/110 |
| 2004/0073437 A1 * | 4/2004 | Halgas et al. ..................... | 705/1 |
| 2004/0125877 A1 * | 7/2004 | Chang et al. ............. | 375/240.28 |

(Continued)

OTHER PUBLICATIONS

M. Hiestand, "Baseball talking box score far beyond where any stat man has gone before", USA Today Sports, Section C, May 20, 2004.

(Continued)

*Primary Examiner* — Tauqir Hussain
(74) *Attorney, Agent, or Firm* — Foley & Lardner LLP

(57) ABSTRACT

A system is provided for selectively presenting a portion of an event to a user. The system includes a first device, a second device, and a network allowing communication between the first and the second device. An application at the first device displays a plurality of sub-events that characterize an event; receives an input from a user whereby the user selects a sub-event from the plurality of sub-events; sends a request to a second device, the request comprising information associated with the selected sub-event; receives media data from the second device whereby the media data represents the selected sub-event; and presents the received media data. An application at the second device receives the request from the first device, selects the media data that represents the selected sub-event from a database using the information associated with the selected sub-event, and sends the selected media data to the first device.

9 Claims, 10 Drawing Sheets

(56) References Cited

U.S. PATENT DOCUMENTS

| | | | |
|---|---|---|---|
| 2004/0158638 A1* | 8/2004 | Peters et al. | 709/227 |
| 2004/0197088 A1* | 10/2004 | Ferman et al. | 386/117 |
| 2004/0254844 A1* | 12/2004 | Torres | 705/26 |
| 2005/0005308 A1* | 1/2005 | Logan et al. | 725/135 |
| 2005/0138123 A1* | 6/2005 | Yun et al. | 709/206 |

OTHER PUBLICATIONS

K. Dean, "Baseball Hits a Homer Online", Wired News, May 29, 2004.

S. Gregory, "Log Me Into The Ball Game", page print from http://www.time.come/time/magazine/article/0,9171,1101040621=650713,00.html, printed on Jun. 16, 2004.

Gordon, Kenneth, "Interactive Broadband Video at the Garden," Digital Video Magazine, Apr. 2000, 11 pages.

Gussow, Dave, "Sittin' in the captain's chair," St. Petersburg Times, Mar. 30, 1998, 4 pages.

Alm, Richard, "New arena a technical marvel," The Dallas Morning News, Oct. 15, 2000, 6 pages.

Schmuckler, Eric, "Best Seat in the House?", Brandweek, Oct. 16, 2000, 41(40)48, 5 pages.

* cited by examiner

MEDIA PLAY OF SELECTED PORTIONS OF AN EVENT

FIELD OF THE INVENTION

The present invention is related generally to the presentation of sub-events that characterize an event. More specifically, the present invention relates to the media play of user selectable sub-events that characterize an event.

BACKGROUND OF THE INVENTION

The Internet is a wide area network that connects hundreds of thousands of computers and smaller sub-networks worldwide. Businesses, government bodies and entities, educational organizations, and individuals publish information or data organized in the form of websites. A website may comprise multiple web pages that display a specific set of information and may contain links to other web pages with related or additional information. Some web pages include multiple web pages that are displayed together in a single user interface window. Each web page is identified by a Uniform Resource Locator (URL) that includes the location or Web address of the computer that contains the resource to be accessed in addition to the location of the resource on that computer.

An Internet or Web address, generally is composed of four parts: a protocol name, the location of a web server that provides the website information, a name identifying the organization or individual that maintains the web server, and a suffix that identifies the type of organization. For example, ".com" identifies a commercial organization, ".edu" identifies an educational institution, and ".gov" identifies a government organization. The protocol name specifies the protocol that defines the set of rules and standards to be applied when exchanging information between the web server that communicates the website information and a client computer that receives and displays the website information. The URL includes the Internet address and the resource location on the web server. The resource defines the web page presentation.

Streaming refers to the ability to play media streams such as audio and video streams in a continuous way while those streams are being transmitted to the client computer over a network such as the Internet. Applications, that can be built on top of streaming services, can be classified into live information delivery and on-demand applications. Live information delivery applications include the live delivery of radio and television programs. On-demand information delivery applications include music, news-on-demand, and sports-on-demand applications. Conversely, the Multimedia Messaging Service (MMS), e-mail, and the Short Messaging Service (SMS), for example, transmit messages to and from devices in a store-and-forward manner and allow the transmission of a combination of text, sounds, images, and video.

The Packet-switched Streaming Service (PSS) provides a framework for Internet Protocol (IP) based streaming applications over networks. IP is a communications protocol that supports the creation of large, geographically-diverse networks of computers using a variety of physical communication linkage technologies. An IP address is the numerical address that defines a location of a computer on the Internet. Using the Domain Name System (DNS), the numerical IP address maps to the location of the web server contained in the URL. Computers on the Internet use IP addresses to route traffic and to establish connections among themselves.

The Real Time Streaming Protocol (RTSP) is an industry standard streaming multimedia application layer protocol. RTSP provides an extensible framework to enable controlled, on-demand delivery of real-time data, such as audio and video data. Sources of data can include both live data feeds and stored clips (on-demand). The protocol is intended to control multiple data delivery sessions, to provide a means for choosing delivery channels such as User Datagram Protocol (UDP), multicast UDP, and Transmission Control Protocol (TCP), and to provide a means for choosing delivery mechanisms based upon the Real-Time Transport Protocol (RTP).

UDP is a transport layer protocol used in the Internet that does not establish a connection or provide reliable data transfer. Multicast UDP supports one to many message transmission using UDP. In multicast UDP, a computer must join the multicast group to send and/or to receive data for the multicast group. In contrast, TCP is a transport layer protocol used in the Internet that establishes a connection between the computers and provides reliable data transfer.

In PSS, RTSP is used in the streaming of continuous media to provide session set-up and to control the individual media streams. RTSP is a text-based protocol. RTSP is intentionally similar in syntax and operation to HTTP/1.1 so that extension mechanisms to HTTP can in most cases also be added to RTSP. An RTSP session typically consists of a client computer defining a transport mechanism for the continuous media stream and then starting the stream. The stream may be paused temporarily. RTSP controls the stream, that may be sent via a separate protocol, independent of the control channel. For example, RTSP control may occur on a TCP connection while the streaming data flows using UDP.

RTP enables the controlled delivery of real-time data, such as audio, video, or simulation data. Sources of the data can include both live and on-demand content. RTP provides end-to-end network transport functions for applications transmitting real-time data over multicast or unicast network services. RTP supports content identification, sequence numbering, timing reconstruction, and delivery monitoring to the real-time applications. RTSP is designed to work with established protocols such as RTP and HTTP.

Both on-demand and live streaming media data can be accessed by a client computer using the Internet and streaming protocols. On-demand streaming media data may be associated with a variety of different events including, but not limited to, sporting events, concerts, news events, etc. After the event completion, the event may be divided into a set of specific sub-events that together describe and summarize the key characteristics of the event. The types of characterizing sub-events may depend on the type of event. For example, a baseball box score has been used by baseball fans since the early 1800's to summarize a baseball game using a set of data associated with each player and each pitcher. However, while an individual may not have the time necessary to view and/or to listen to a recording of the entire event, reviewing a set of numbers that summarize a sporting event or brief text that describes a news event does not allow the individual to sufficiently experience the event. What is needed, therefore, is a system that permits an individual to experience the characterizing sub-events associated with the event instead of looking at, for example, numbers or summary text or being required to view a recording of the entire event. What is further needed is a system that automatically links the characterizing sub-events with a recording of the entire event to reduce the time and the cost associated with implementing the system.

SUMMARY OF THE INVENTION

An embodiment of the invention relates to a method of selectively presenting a portion of an event to a user. The method includes, but is not limited to, displaying a plurality of sub-events that characterize an event at a first device whereby a user selects a sub-event from the plurality of sub-events, sending a request from the first device to a second device, the request comprising information associated with the selected sub-event, selecting media data at the second device that represents the selected sub-event from a database accessible by the second device using the information, sending the selected media data from the second device to the first device, and presenting the selected media data at the first device.

The information may include, but is not limited to, an event identifier, a sub-event code, and a sub-event performer. Selecting the media data may comprise identifying a media file using the event identifier and identifying a media play time window within the identified media file using the sub-event code. In an alternative embodiment, selecting the media data may comprise identifying a media file using the event identifier and identifying a media play time window within the identified media file using the sub-event code and the sub-event performer.

The plurality of sub-events may include, but is not limited to, statistics from a sporting event, a baseball box score, and a golf scorecard. The sporting event may include, but is not limited to, a golf tournament, a baseball game, a football game, a basketball game, a soccer match, a softball game, and a hockey game. The sub-event may be selected from the group consisting of an at bat, a run, a hit, a run batted in, a base on balls, a strikeout, a left on base, an earned run, a single, a double, a triple, an error, and a home run. Sending the selected media data may comprise, but is not limited to, streaming the media data and/or using a service that includes, but is not limited to, a multimedia messaging service, a short messaging service, and an e-mail service without limitation.

Another embodiment of the invention relates to a computer program product for selectively presenting a portion of an event to a user. The computer program product includes, but is not limited to, computer code configured to display a plurality of sub-events that characterize an event, to receive an input from a user whereby the user selects a sub-event from the plurality of sub-events, to send a request to a device, the request comprising information associated with the selected sub-event, to receive media data from the device whereby the media data represents the selected sub-event, and to present the received media data.

Another embodiment of the invention relates to a computer program product for sending a portion of an event to a user. The computer program product includes, but is not limited to, computer code configured to receive a request from a device, wherein the request comprises information associated with a sub-event selected by a user from a plurality of sub-events that characterize an event, to select media data that represents the selected sub-event from a database using the information, and to send the selected media data to the device.

Still another embodiment of the invention relates to a device for selectively presenting a portion of an event to a user. The device includes, but is not limited to, an application, a communication interface, a memory, and a processor. The application includes, but is not limited to, computer code configured to display a plurality of sub-events that characterize an event, to receive an input from a user whereby the user selects a sub-event from the plurality of sub-events, to send a request to a second device, the request comprising information associated with the selected sub-event, to receive media data from the second device whereby the media data represents the selected sub-event, and to present the received media data. The communication interface is configured to provide an interface between the application and the second device. The memory is configured to store the application. The processor couples to the memory and is configured to execute the application.

Still another embodiment of the invention relates to a device for sending a portion of an event to a user. The device includes, but is not limited to, an application, a communication interface, a memory, and a processor. The application comprises computer code configured to receive a request from a second device, wherein the request comprises information associated with a sub-event selected by a user from a plurality of sub-events that characterize an event, to select media data that represents the selected sub-event from a database using the information, and to send the selected media data to the second device. The communication interface is configured to provide an interface between the application and the second device. The memory is configured to store the application. The processor couples to the memory and is configured to execute the application.

Still another embodiment of the invention relates to a system for selectively presenting a portion of an event to a user. The system includes, but is not limited to, a first device, a second device, and a network. The first device includes, but is not limited to, a first application, a first communication interface, a first memory, and a first processor. The first application comprises computer code configured to display a plurality of sub-events that characterize an event, to receive an input from a user whereby the user selects a sub-event from the plurality of sub-events, to send a request to the second device, the request comprising information associated with the selected sub-event, to receive media data from the second device whereby the media data represents the selected sub-event, and to present the received media data. The first communication interface is configured to provide an interface between the first application and the second device. The first memory is configured to store the first application. The first processor couples to the first memory and is configured to execute the first application.

The second device includes, but is not limited to, a second application, a second communication interface, a second memory, and a second processor. The second application comprises computer code configured to receive the request from the first device, to select media data that represents the selected sub-event from a database using the information, and to send the selected media data to the first device. The second communication interface is configured to provide an interface between the second application and the first device. The second memory is configured to store the second application. The second processor couples to the second memory and is configured to execute the second application. The network is configured to allow communication between the first communication interface and the second communication interface.

Other principal features and advantages of the invention will become apparent to those skilled in the art upon review of the following drawings, the detailed description, and the appended claims.

BRIEF DESCRIPTION OF THE DRAWINGS

The preferred embodiments will hereafter be described with reference to the accompanying drawings, wherein like numerals will denote like elements.

DETAILED DESCRIPTION OF THE PREFERRED EMBODIMENTS

Figure 1:
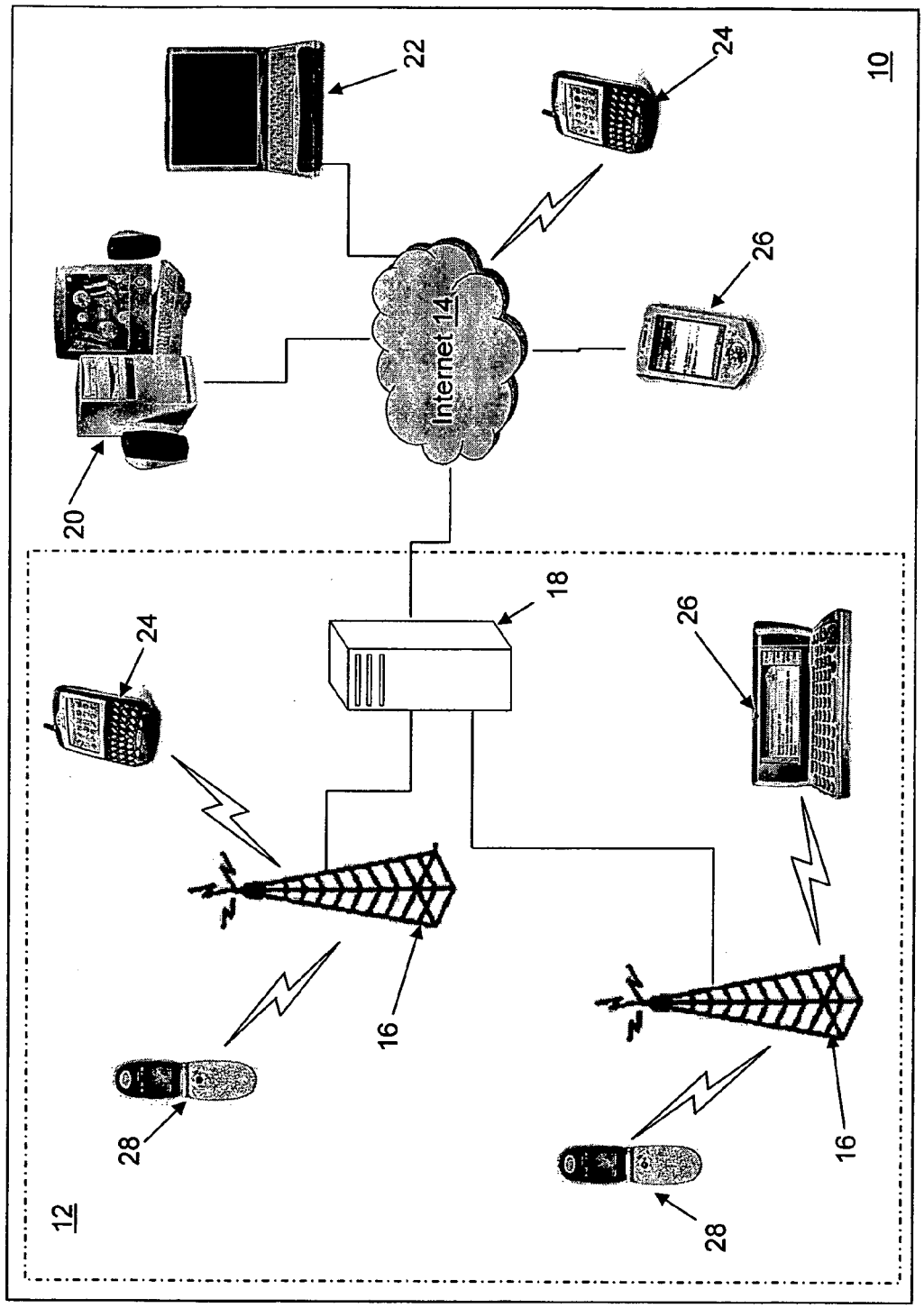
FIG. 1 is a diagram of a system in accordance with an example embodiment.

With reference to FIG. 1, the system 10 is comprised of multiple devices that can communicate through a network. The system 10 may comprise any combination of wired or wireless networks including, but not limited to, a cellular telephone network 12, a wireless Local Area Network (LAN), a Bluetooth personal area network, an Ethernet LAN, a token ring LAN, a wide area network, the Internet 14, etc. The system 10 may include both wired and wireless devices. For exemplification, the system 10 shown in FIG. 1 includes the cellular telephone network 12 and the Internet 14. Connectivity to the Internet 14 may include, but is not limited to, long range wireless connections, short range wireless connections, and various wired connections including, but not limited to, telephone lines, cable lines, power lines, digital cable, Video on Demand (VOD), etc.

The cellular telephone network 12 includes, but is not limited to, one or more devices, a base station 16, and a network server 18. In the cellular telephone network 12, the devices may send and receive signals through the base station 16. The network server 18 allows communication between the devices and another network. For example, the network server 18 may connect the devices with other devices through the Internet 14. The devices may include, but are not limited to, a desktop computer 20, a notebook computer 22, a Messaging Device (MD) 24, a Personal Digital Assistant (PDA) 26, and/or a cellular telephone 28. The system 10 may include additional devices and devices of different types as well as any combination of these devices.

Figure 2:
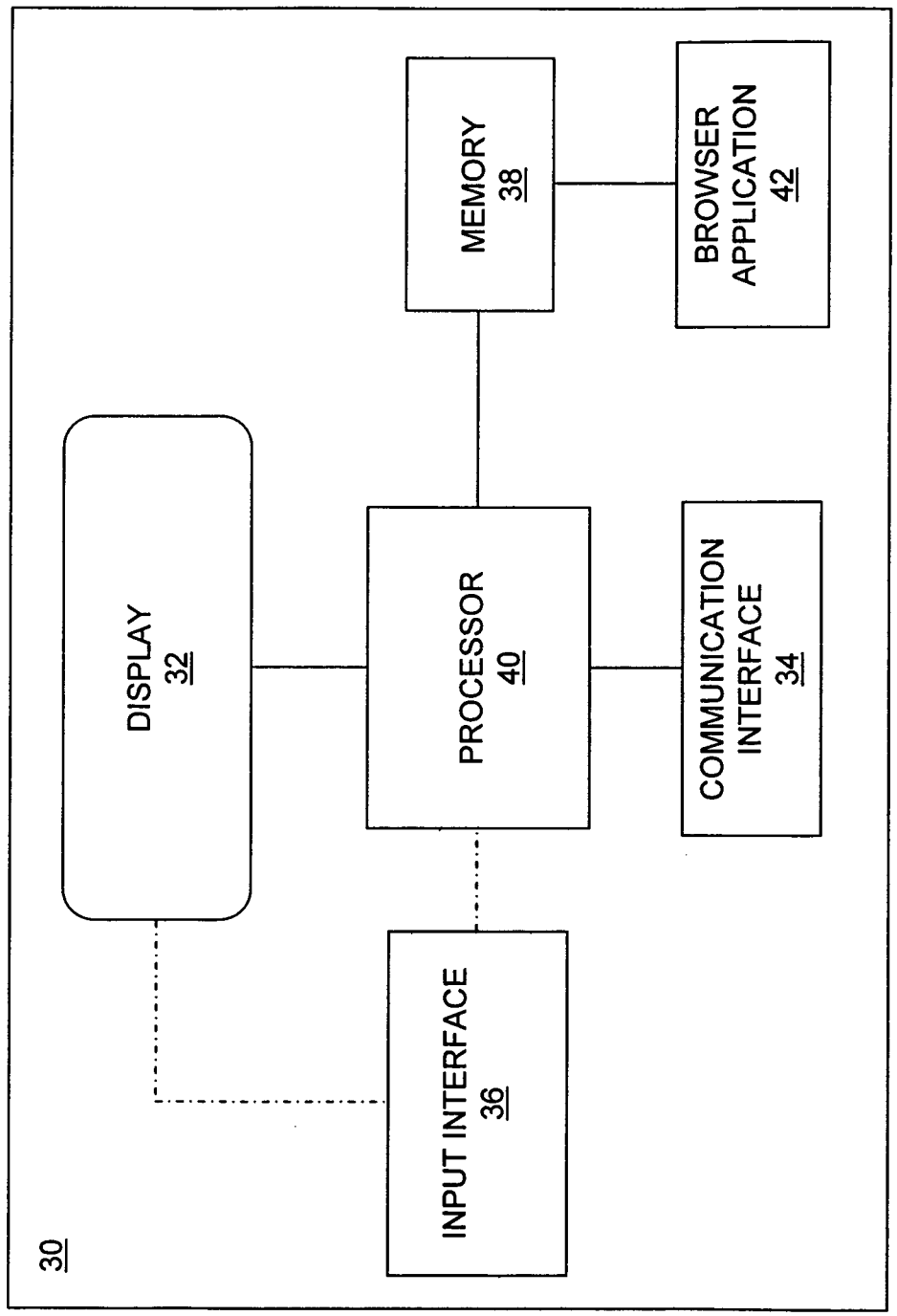
FIG. 2 is a block diagram of a client device for use in the system of FIG. 1 in accordance with an example embodiment.

For exemplification, FIG. 2 shows a block diagram of an example device that may be included in system 10. The client device 30 includes a display 32, a communication interface 34, an input interface 36, a memory 38, a processor 40, and a browser application 42. The term "device" should be understood to include, without limitation, cellular telephones, PDAs, MDs, computers of all form factors, etc. The client device 30 may or may not be mobile. Different and additional components may be incorporated into the client device 30. The client device 30 allows a user to connect to a network, such as the Internet 14, and to view and/or to hear media data using a variety of formats. The components of client device 30 may each be internal or external to the client device 30. The components may connect to each other using a number of different methods as known to those skilled in the art. Connections between the components of client device 30 may be other than or in addition to those shown in FIG. 2.

The display 32 presents information to the user of the client device 30 including, but not limited to, information from the browser application 42. The display may be, but is not limited to, a thin film transistor (TFT) display, a light emitting diode (LED) display, a Liquid Crystal Display (LCD), a Cathode Ray Tube (CRT) display, etc.

The communication interface 34 provides an interface for receiving and transmitting calls, messages, and/or any other information communicated across a network including, but not limited to, streaming media and multimedia messages. Communications between the client device 30 and the network may be through one or more of the following connection methods, without limitation: an infrared communications link, a wireless communications link, a cellular network link, a physical serial connection, a physical parallel connection, a link established according to the Transmission Control Protocol/Internet Protocol (TCP/IP), etc. Communications between the client device 30 and the network may use one or more of the following communication protocols, without limitation: HTTP, TCP/IP, RTSP, RTP, UDP, multicast UDP, etc. Transferring content to and from the client device 30 may use one or more of these connection methods and communication protocols or any others known to those skilled in the art or to be developed in the future.

The input interface 36 provides an interface for receiving information from the user for entry into the client device 30. The input interface 36 may use various input technologies including, but not limited to, a keyboard, a pen and touch screen, a mouse, a track ball, a touch screen, a keypad, one or more buttons, etc. to allow the user to enter information into the client device 30 or to make selections from the client device 30. The input interface 36 may provide both an input and an output interface. For example, a touch screen display allows the user to make selections and presents information to the user.

The memory 38 provides an electronic holding place for an operating system of the client device 30, the browser application 42, and/or other applications. The client device 30 may have a plurality of memory devices 38 that use the same or different memory technologies. Example memory technologies include, but are not limited to, Random Access Memory (RAM), Read Only Memory (ROM), flash memory, etc. Data in RAM is volatile meaning that it remains only as long as the client device 30 is turned on. When the client device 30 is turned off, RAM loses its data. The values stored in ROM are always there, whether the client device 30 is on or not. For this reason, it is called non-volatile memory. Flash memory is a type of constantly-powered non-volatile memory that can be erased and reprogrammed in units of memory called blocks. A variety of different storage media may be used for each memory technology. For example, a Compact Disk (CD), a Digital Video Disk (DVD), and a hard disk are all ROM storage media types.

The processor 40 executes instructions that cause the client device 30 to perform various functions. The instructions may be written using one or more programming languages, scripting languages, assembly languages, etc. Additionally, the instructions may be carried out by a special purpose computer, logic circuits, or hardware circuits. Thus, the processor 40 may be implemented in hardware, firmware, software, or any combination of these methods. The term "execution" refers to the process of running an application or program or the carrying out of the operation called for by an instruction. The processor 40 executes an application meaning that it performs the operations called for by that application in the form of a series of instructions. The processor 40 may retrieve an application from a non-volatile memory that is generally some form of ROM or flash memory and may copy the instructions in an executable form to a temporary memory that is generally some form of RAM. The processor 40 may execute instructions embodied in the browser application 42. The client device 30 may include one or more processors 40.

The browser application 42 may communicate with one or more web servers. The browser application 42 may respond to HTTP commands, may interpret HTML and other Internet programming languages including, but not limited to, Java™ and Perl, and may present a web page for viewing by the user. The browser application 42 may display or otherwise process media data or media streams. The streams may be for on-demand use or for live information delivery. The browser application 42 may additionally support MMS message formats. Processing a stream refers to the ability of an application to play media streams such as audio and video streams or simulation data streams in a continuous way while those streams are being transmitted to the device over the network. A streaming session generally may be paused and resumed. An on demand streaming media session also may be indexed forward and backward.

Figure 3:
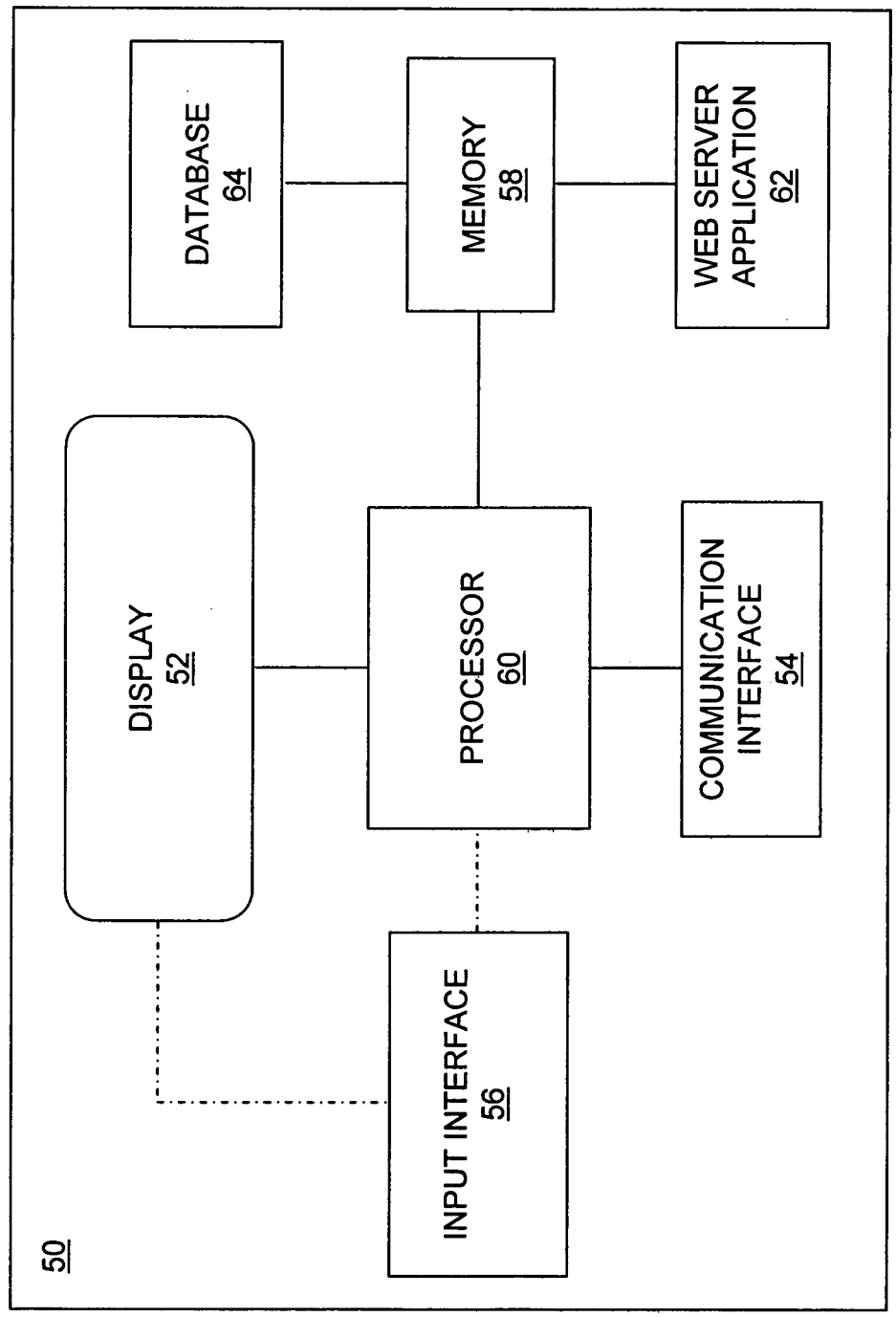
FIG. 3 is a block diagram of a server device for use in the system of FIG. 1 in accordance with an example embodiment.

For exemplification, FIG. 3 shows a block diagram of a server device 50 that includes a display 52, a communication interface 54, an input interface 56, a memory 58, a processor 60, a web server application 62, and a database 64. Different and additional components may be incorporated into the server device 50. The server device 50 communicates website information to the client device 30. The components of server device 50 may each be internal or external to the server device 50. The components may connect using a number of different methods as known to those skilled in the art. Connections may be other than or in addition to those shown in FIG. 3.

The display 52 presents information to the user of the server device 50 including, but not limited to, information from the web server application 62. The display may be, but is not limited to, a TFT display, an LED display, an LCD display, a CRT display, etc. The display 52 is optional.

The communication interface 54 provides an interface for receiving and transmitting calls, messages, and/or any other information communicated across a network including streaming media and multimedia messages. Communications between the server device 50 and the network may be through one or more of the following connection methods, without limitation: an infrared communications link, a wireless communications link, a cellular network link, a physical serial connection, a physical parallel connection, a link established according to the TCP/IP Standards, etc. Communications between the server device 50 and the network may use one or more of the following communication protocols, without limitation: HTTP, TCP/IP, RTSP, RTP, UDP, multicast UDP, etc. Transferring content to and from the server device 50 may use one or more of these connection methods and communication protocols or any others known to those skilled in the art or to be developed in the future.

The input interface 56 may provide an interface for receiving information from the user for entry into the server device 50. The input interface 56 may use various input technologies including, but not limited to, a keyboard, a pen and touch screen, a mouse, a track ball, a touch screen, a keypad, one or more buttons, etc. to allow the user to enter information into the server device 50 or to make selections from the server device 50. The input interface 56 may provide both an input and an output interface. For example, a touch screen display allows the user to make selections and presents information to the user. The input interface 56 is optional.

The memory 58 provides an electronic holding place for an operating system of the server device 50, the web server application 42, the database 64, and/or other applications so that the information can be reached quickly by the processor 60. The server device 50 may have a plurality of memory devices 58 that may use different memory technologies including, but not limited to, RAM, ROM, flash memory, etc.

The processor 60 executes instructions that cause the server device 50 to perform various functions. The instructions may be written using one or more programming languages, scripting languages, assembly languages, etc. Additionally, the instructions may be carried out by a special purpose computer, logic circuits, or hardware circuits. Thus, the processor 60 may be implemented in hardware, firmware, software, or any combination of these methods. The processor 60 executes an application meaning that it performs the operations called for by that application in the form of a series of instructions. The processor 60 may retrieve an application from a non-volatile memory that is generally some form of ROM or flash memory and may copy the instructions in an executable form to a temporary memory that is generally some form of RAM. The processor 60 may execute instructions embodied in the web server application 62. The server device 50 may include one or more processors 60.

The web server application 62 may communicate with the browser application 42 at the client device 30. The web server application 62 may respond to HTTP commands and may transmit one or more web pages to the client device 30 based on the user selection at the client device 30. The web server application 62 may transmit or otherwise process media data or media streams. The streams may be for on-demand use or for live information delivery. The web server application 62 may additionally transmit messages using for example, MMS, SMS, e-mail, etc.

The database 64 may store web pages and information associated with the web pages including media data. The web server application 62 interfaces with the database 64. The database may utilize various database technologies as known to those skilled in the art including a simple file system and/or a system of tables. The database 64 also may use a variety of different formats as known to those skilled in the art. The server device 50 may include a plurality of databases 64. The database 64 also may be used to synchronize event and sub-event timing information at certain intervals or in real time using industry standard database technology.

Figure 4:
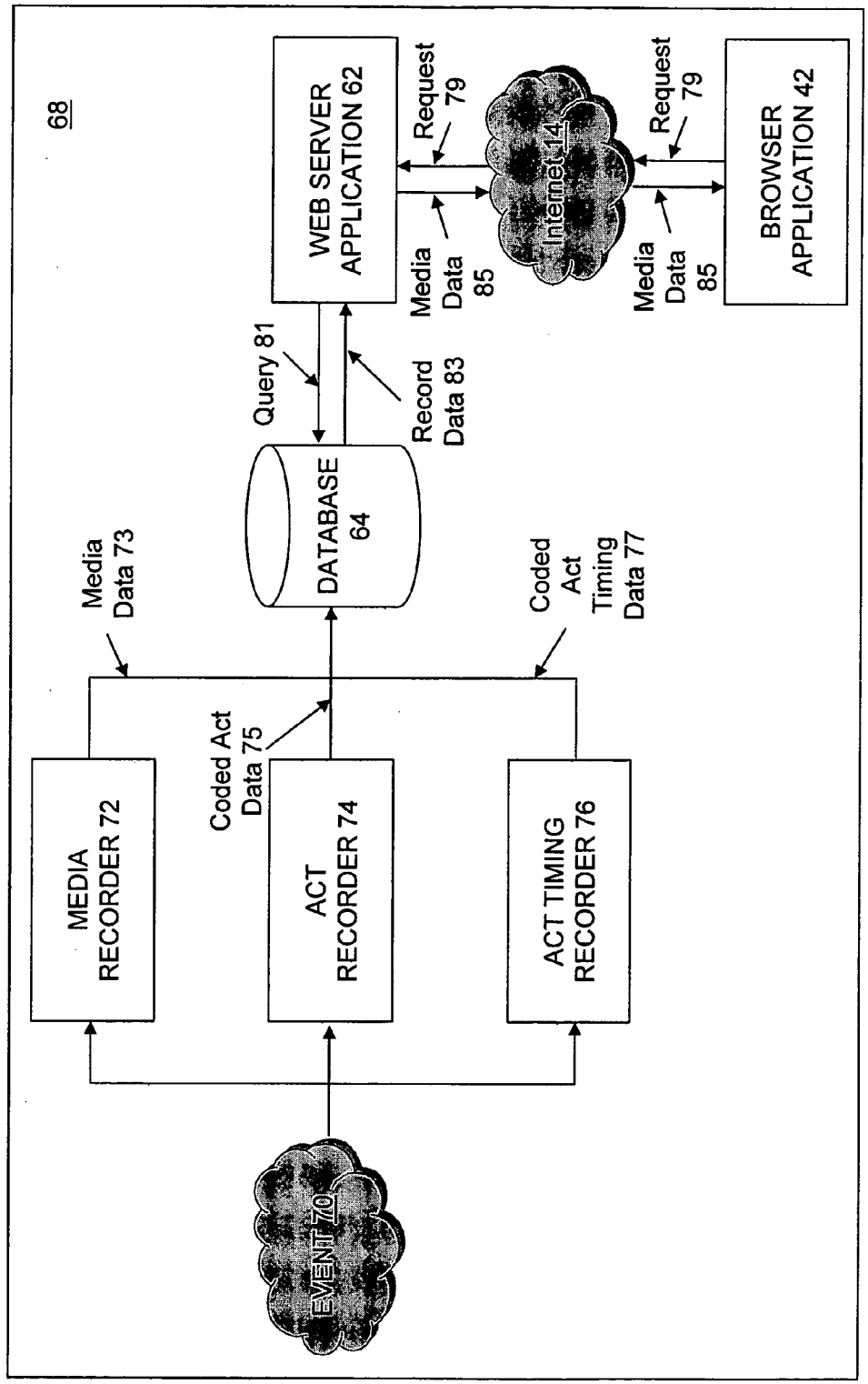
FIG. 4 is a block diagram of a process for using the system of FIG. 1 in accordance with an example embodiment of the present invention.

The block diagram of FIG. 4 shows a functional diagram of process 68. An event 70 occurs that, for example, may be a sporting event, a concert, a news event, etc. A media recorder 72 captures and records media data 73 of the event 70. The media recorder 72 may be one or more cameras, microphones, and/or other media recording devices. The media data 73 may be recorded in a variety of file formats as known to those skilled in the art both now and in the future. During or at the completion of the event 70, the media data 73 recorded by the media recorder 72 is stored in the database 64. The database 64 may be located at the event location or may be remote from the event location. Storing the media data 73 to the database 64 may utilize a network connection, and the media data 73 may be recorded to the database 64 during the event 70.

A sub-event recorder 74 records the specific sub-events that characterize the event 70. The sub-events may be captured by an observer listening to or viewing the event 70 either at the event location or remote from the event location. The observer may capture the sub-events either during or at the completion of the event 70.

Each sub-event may be identified using a code predefined based on the type of sub-event. Each sub-event may be recorded using the code that corresponds to the type of sub-event thereby creating coded sub-event data 75 that is associated with the event 70. The types of sub-events defined may depend on the type of event 70. Additionally, the individual performing the sub-event may be recorded with the sub-event code. For example, if the event is a baseball game, the sub-event types may include, but are not limited to, an at bat, a hit, a base on balls, a strikeout, a single, a double, a triple, a homerun, a run batted in, a run, a left on base, an error, an earned run, etc. The sub-event codes that correspond to the sub-event types, for example, may be numerical or textual in format. The name of the baseball player performing the sub-event may be recorded with the sub-event code as the sub-event performer.

As another example, if the event is a football game, the sub-event types may include, but are not limited to, a tackle, a fumble, a touchdown, an interception, a field goal, a point after kick, a kick-off, a punt, a reception, a sack, etc. The name of the football player performing the sub-event may be recorded with the sub-event type code as the sub-event performer.

As yet another example, if the event is a golf match, the sub-event types may include, but are not limited to, an eagle, a birdie, a par, a bogie, a double bogie, a hole in one, etc. The name of the golfer performing the sub-event may be recorded with the sub-event type code as the sub-event performer. Additionally, a hole number may be recorded with the golfer name and/or the sub-event type code. As yet another example, if the event is a news event, the sub-event types may be descriptors or sequential numbers defined by the sub-event recorder 74 that may include an individual or a group associated with performance of the sub-event.

As another example, if the event is a basketball game, the sub-event types may include, but are not limited to, a 3-point shot, a foul shot, a 2-point shot, a foul, a rebound, an assist, a blocked-shot, etc. The name of the basketball player performing the sub-event may be recorded with the sub-event type code as the sub-event performer.

During or at the completion of the event 70, the coded sub-event data 75 may be stored in the database 64 or in memory prior to or instead of in the database 64. Storing the coded sub-event data 75 to the database 64 may utilize a network connection. The coded sub-event data 75 may be stored in a variety of formats as known to those skilled in the art. For example, the coded sub-event data 75 may be recorded as a set of tables. The sub-event recorder 74 may be embodied in any device.

A sub-event timing recorder 76 may record the timing of the sub-events of the event 70. The timing of the sub-events may be captured by an observer listening to or viewing the event 70. Each sub-event may be recorded using the same code used by the sub-event recorder 74 thereby creating coded sub-event timing data 77 that is associated with the event 70. The same or a different observer may capture the coded sub-event timing data 77 and the coded sub-event data 75. The timing data for each sub-event may be measured relative to a number of different time references and in a variety of formats. For example, the timing data may be measured relative to the beginning of the event 70, relative to Greenwich Mean Time, relative to a local time, etc. The timing data may include the date of the event or the date may be maintained separately.

The event 70 may be sub divided into distinct sections that include one or more sub-events. For example, a distinct section of a baseball game may be, but is not limited to, an at bat, a half inning, and/or an inning. As another example, a distinct section of a football game may be, but is not limited to, a single down, a team's possession of the football, and/or a quarter. Under some circumstances, the occurrence of a sub-event during an event 70 may be missed or otherwise not recorded. By counting sub-events relative to a distinct section, whenever the sub-event timing recorder 76 or sub-event recorder 74 misses a sub-event, recording of the sub-events re-starts at the beginning of the next distinct section so that the sub-event timing recorder 76 and sub-event recorder 74 remain synchronized. Thus, only sub-events included in a distinct section that are common to both the sub-event timing recorder 76 and the sub-event recorder 74 are included with the event 70 to avoid matching a sub-event with the wrong time.

The timing of the sub-event may be designated using different methods, but generally defines a time window. For example, the sub-event time window during which the sub-event occurs may be captured using a start time and a stop time for the sub-event. Alternatively, the sub-event time window during which the sub-event occurs may be captured using a start time and a sub-event time duration. The start time may indicate the time relative to the beginning of the media data 73 that the selected sub-event occurs. The sub-event duration may indicate the duration of the media data associated with the selected sub-event. The time window defines the time during which the media data contains the sub-event or sub-events.

The device used to record the coded sub-event timing data 77 may be the same or different from the device used to record the coded sub-event data 75. During or at the completion of the event 70, the coded sub-event timing data 77 may be stored in the database 64. Storing the coded sub-event timing data 77 to the database 64 may utilize a network connection. The coded sub-event timing data 77 may be stored in a variety of formats as known to those skilled in the art. The sub-event timing recorder 76 may be embodied in any device. The sub-event timing recorder 76 and the sub-event recorder 74 may be combined in the same device.

At the conclusion of the event 70, or during the event 70 when the sub-event data and the sub-event timing data are both available, the coded sub-event data 75 may be merged with the coded sub-event timing data 77 to create a single table or record of data associated with the event 70. Alternatively, the coded sub-event timing data 77 and the coded sub-event data 75 may have been recorded initially in the single table of data. The table of data may include a cross reference to the name of the file that holds the media data 73. So that a viewer of the recorded media subsequent to the event 70 understands the context of a selected sub-event, the coded sub-event timing data 77 may be adjusted to include additional time before and/or after the occurrence of the sub-event. For example, if the sub-event starts at 1:10:00 and ends at 1:20:00, a thirty second roll-in and roll-out time period may be added to the coded sub-event timing data 77 so that the recorded media "plays" from 1:09:30 to 1:20:30. The roll-in and roll-out time periods may be shorter or longer than thirty seconds and may depend upon the event 70.

Figure 5:
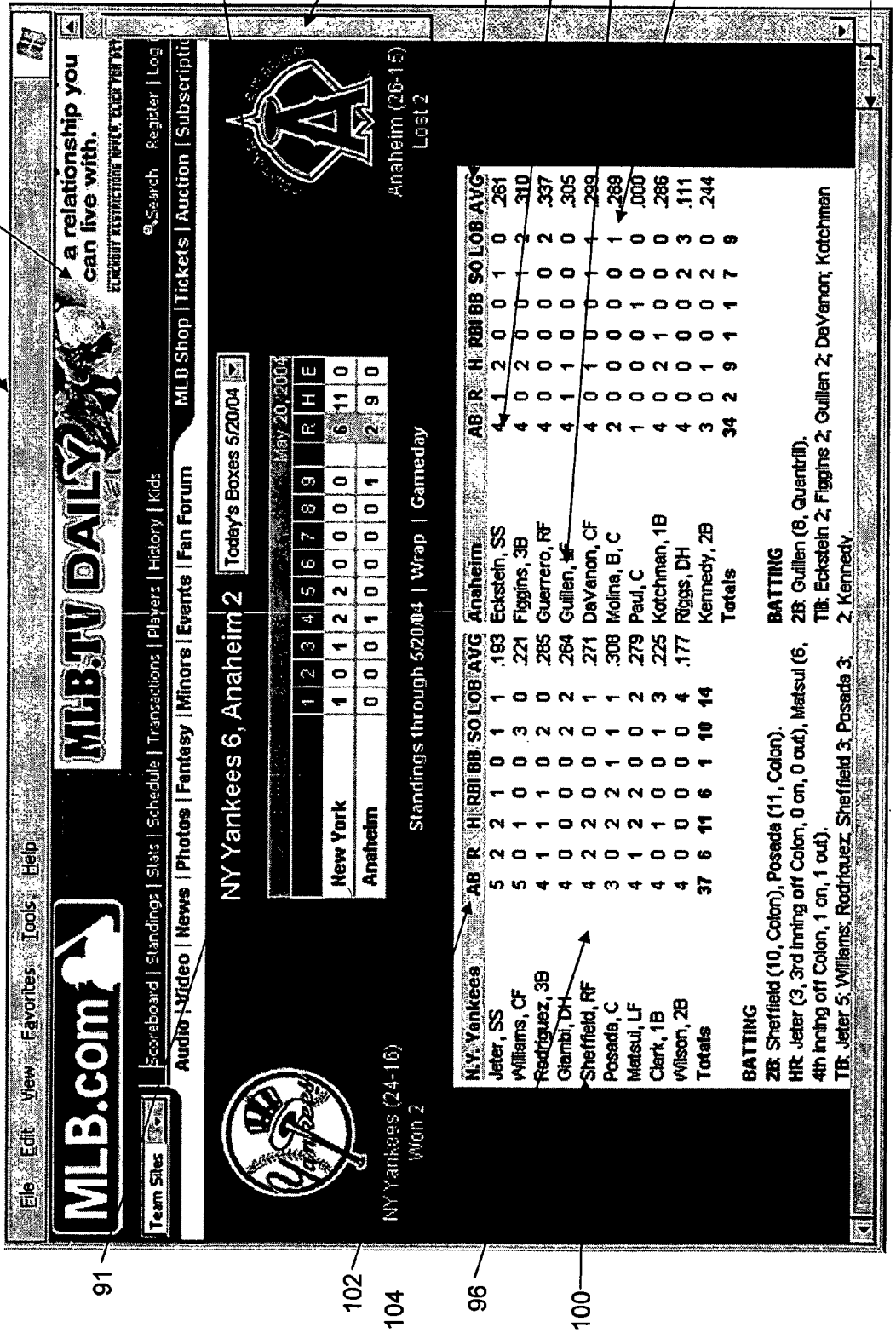
FIG. 5 depicts an example user interface for display on the device of FIG. 2, wherein the example user interface includes a sub-event table.
Figure 7:
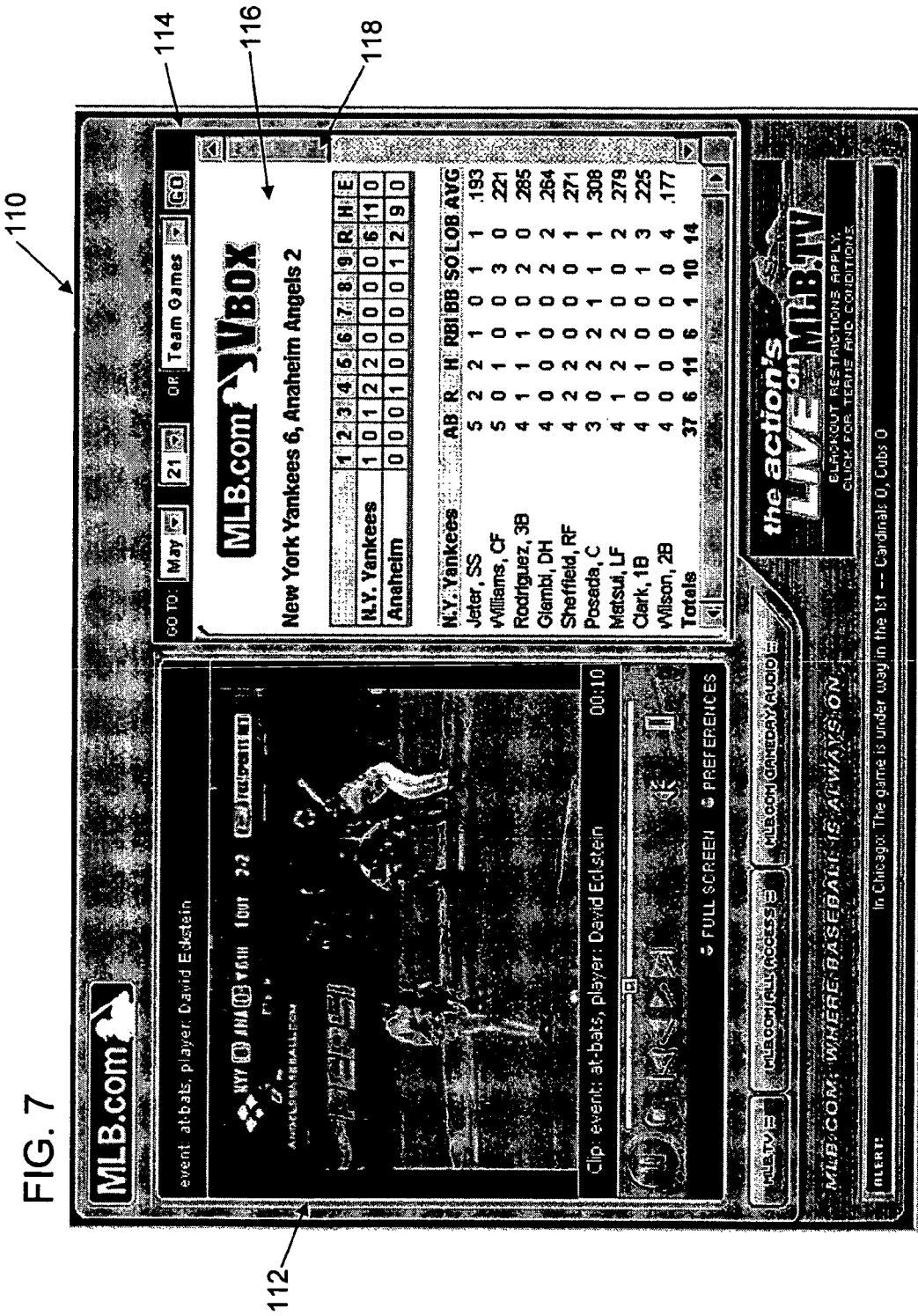
FIG. 7 depicts the second example user interface of FIG. 6 showing media data on the media player.

The web server application 62 executes at the server device 50 and provides web pages to the browser application 42 executing at the client device 30 using a network that may include the Internet 14. For example, FIG. 5 shows an example web page that may be provided by the web server application 62 and displayed to a user at the client device 30 on the display 32 using the browser application 42. User interface window 90 created by the browser application 42 displays a web page 92 and includes, but is not limited to, a vertical scroll bar 94 and a horizontal scroll bar 95. The web page 92 includes, but is not limited to, a game identifier 91, a game date 93, a first sub-event table 96, and a second sub-event table 98. The plurality of sub-events included in the sub-event table may be included in different forms. For example, a list of sub-events may be displayed or a series of golf scorecards may be displayed. The sub-event tables 96, 98 characterize the event identified by the game identifier 91 which, in the example shown in FIG. 7, is a baseball game between the New York Yankees and the Anaheim Angels. The game date 93 defines the date that the event occurred. In the example shown, the event date 93 is May 20, 2004.

The web page 92 may include additional sub-event tables. The additional sub-event tables may be similar to sub-event tables 96, 98 or different from sub-event tables 96, 98. The organization of the sub-event table may vary depending on the type of event. The sub-event tables 96, 98, for example, include a list of players 100 for each team that are the performers of each sub-event. Baseball fans may recognize the sub-event tables 96, 98 as resembling baseball box scores. For each player in the list of players 100, the sub-event table includes sub-event codes 102 that characterize the performance of each player during the baseball game. The sub-event codes 102 shown in the sub-event tables 96, 98 include, but are not limited to, AB (at bat), R (run), H (hit), RBI (run batted in), BB (base on balls), SO (strikeout), and LOB (left on base). The sub-event codes may be other than AB, R, H, RBI, BB, SO, and LOB. For example, the sub-event codes may be numerical code or may be different textual codes.

The user at the client device 30 may select a table entry 104 from the sub-event tables 96, 98 defined by the list of players 100 and the sub-event codes 102 using the input interface 36 of the client device 30. The table entry 104 may comprise a hyperlink. A hyperlink is an HTML command that is embedded in a web page. When selected, the hyperlink may cause the display to shift to another location on the same web page, to shift to a new web page, to shift to an image, a sound, a video, a database, etc. that may or may not be provided by the same web server application 62. Where a table entry 104 includes a hyperlink, the hyperlink may be delineated from the surrounding text, for example, using a different color of text, using a line under the text, and/or changing a symbol displayed when a pointer moves across the hyperlink.

When the user selects the table entry 104, the browser application 42 executed by processor 40 sends a request 79 to the web server application 62 through communication interface 34 identifying the table entry 104 selected by the user. The request 79 includes information related to the table entry 104 selected. For example, the request 79 may include the sub-event code, the sub-event performer, and an event identifier. The event identifier, for example, may include, but is not limited to, the year, the month, the day, and the name of the home team. Thus, by selecting table entry 104, the user requests media data relative to the four "at bats" of baseball player David Eckstein that occurred during the game between the New York Yankees and the Anaheim Angels on May 20, 2004.

The web server application 62 receives the request 79 from the browser application 42 through communication interface 54. The web server application 62 sends a query 81 to the database 64 that includes the request information related to the table entry 104 selected by the user. As known to those skilled in the art, a number of methods may be used to store and to access data in a database. The query 81 may include the sub-event code, the sub-event performer, and the event identifier. In the example of selecting table entry 104, the database 64 matches the player name (David Eckstein), the event identifier (New York Yankees, May 20, 2004), and the sub-event code (AB) to find a database record containing information associated with the sub-event or sub-events.

The database record found may contain a file name and a location of the media data 73 recorded of the game identified by the event identifier. The database record found may further contain one or more time windows. A plurality of time windows indicates that more than one occurrence of the selected sub-event occurred during the event 70. For example, if the user selects the table entry 104 shown in FIG. 5, four sub-events of the "at bat" type occurred that were performed by "Eckstein" during the game played May 20, 2004 between the New York Yankees baseball team and the Anaheim Angels baseball team. Thus, the database record may contain four time windows for the four "at bats" performed by David Eckstein.

The database 64 returns the record data 83 to the web server application 62. The web server application 62 sends one or more HTTP commands to the browser application 42. The HTTP commands may include a resource that is a Java Server Page (JSP). A JSP resource is interpreted using a scripting language based on Java™ that is used to develop dynamic Web pages. The JSP Standard Tag Library (JSTL) encapsulates as simple tags the core functionality common to many Web server applications. JSTL has support for common, structural tasks such as iteration and conditionals, tags for manipulating XML documents, internationalization tags, and Structured Query Language (SQL) tags. Other web page development tools including, but not limited to, Perl CGI, ColdFusion, etc. may be used in alternative embodiments.

Figure 6:
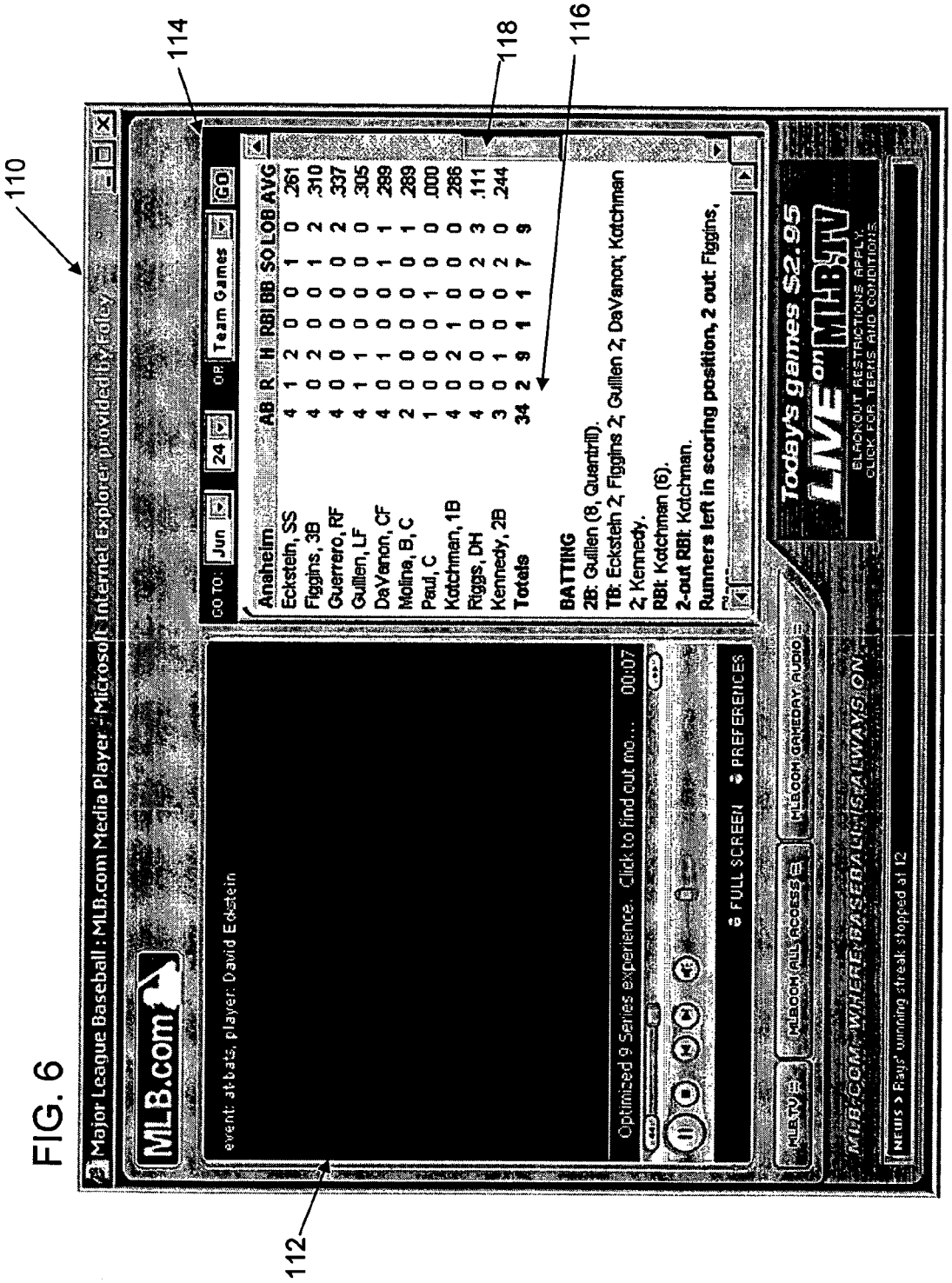
FIG. 6 depicts a second example user interface for display on the device of FIG. 2, wherein the second example user interface includes a first set of sub-events and a media player.

The JSP resource may command the browser application 42 to create a new web browser interface window that includes a media player and a sub-event table interface window. For example, continuing from the example shown in FIG. 5, FIG. 6 shows a web browser frame window 110 that includes a media player 112 and a sub-event table interface window 114 created in response to selection of the table entry 104 from the web page 92. The sub-event table interface window 114 contains a web page 116. From the web page 116, the user may select table entries for display by the media player 112.

The web server application 62 accesses the media data 73 recorded of the game identified by the event identifier and included in the record data 83. The web server application 62 sends the media data 73 associated with the sub-events using the time windows of record data 83 to the browser application 42. The browser application 42 may direct the media data to the media player 112 in the form of a media stream. Implementation details of the media player 112 vary as known to those skilled in the art. For example, the Microsoft™ Windows Media Player may use an ".asx" metafile that can redirect streaming media content away from a browser and to the Windows Media Player and may contain eXtensible Markup Language (XML) scripts that include a sequential playlist of media to be played in succession. When the browser application 42 interprets the ".asx" file sent by the web server application 62, the browser application 42 accesses the streaming media file or files specified in the ".asx" file. For example, as shown in FIG. 7, the media player 112 displays the video captured and recorded for each "at bat" by David Eckstein.

Figure 8:
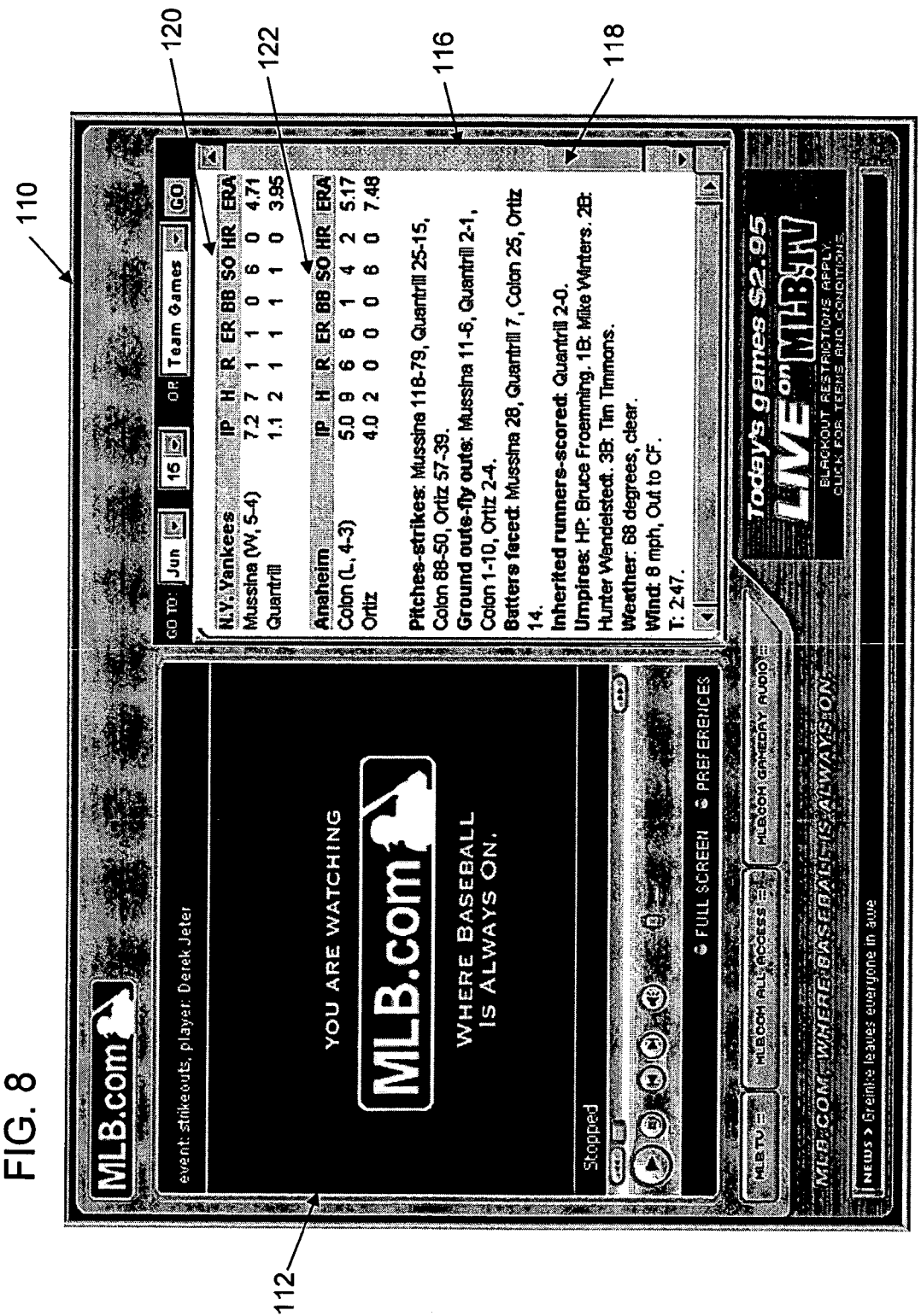
FIG. 8 depicts the second example user interface of FIG. 6 showing a second set of sub-events.

FIG. 8 shows a third sub-event table 120 and a fourth sub-event table 122 that are displayed in web page 116 by scrolling down the web page 116 using a scroll bar 118. Alternative embodiments may include a media player in the user interface window 90. Another alternative embodiment may not include the sub-event table interface window 114 with the media player 112 in the web browser frame window 110.

Figure 9:
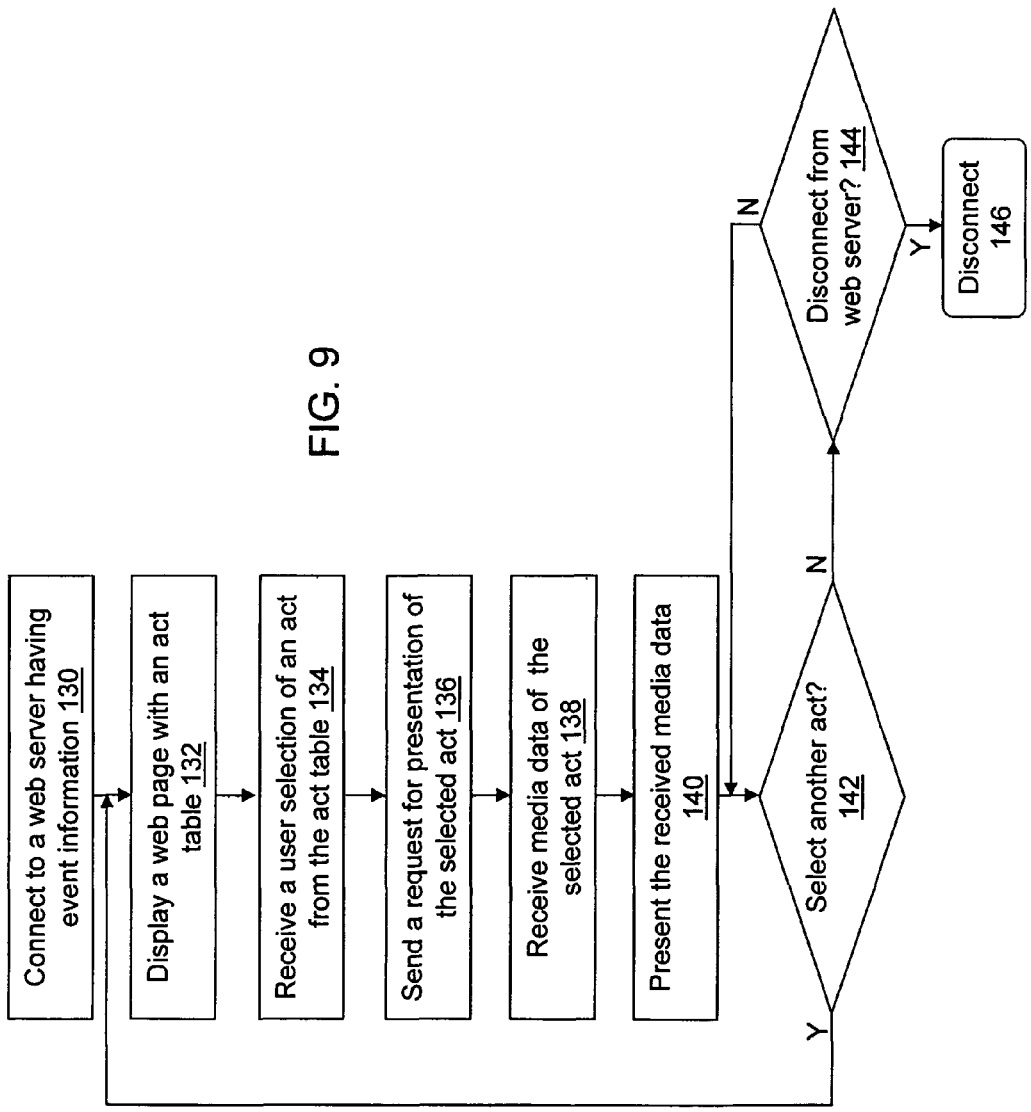
FIG. 9 is a flow diagram of a sub-event presentation using a browser application.

A user executes the browser application 42 and selects a website provided by a web server. The website may have information associated with an event of interest to the user. With reference to FIG. 9, the browser application 42, at operation 130, responds by connecting to the web server having the event information. At operation 132, the browser application 42 displays a web page having a sub-event table, for example, as described with reference to FIG. 5. The user selects a sub-event from the plurality of sub-events in the sub-event table. The browser application 42, at operation 134, receives the user selection of the sub-event from the sub-event table. The browser application 42 sends a request for presentation of the selected sub-event to the web server at operation 136. The request comprises sub-event information associated with the selected sub-event. For example, the sub-event information may include, but is not limited to, the sub-event code, the sub-event performer, and the event identifier.

At operation 138, the browser application 42 receives media data that represents the selected sub-event from the web server. The selected sub-event may include multiple sub-events having the same sub-event characteristics, for example, the same sub-event code and the same sub-event performer. The media data, for example, may include multiple media clips sent successively from the web server or may include a sequential playlist of media to be played in succession. Sending the media data may include, but is not limited to, streaming the media data to the browser and/or sending the media data using messages.

At operation 140, the browser application 42 presents the received media data to the user. As described with reference to FIG. 6, the media data may be presented in the media player 112. The media data may include audio, video, and/or any other media data related to presentation of the selected sub-event. At operation 142, the user may select another sub-event for presentation from the same or a different sub-event table displayed in the same or a different web page maintained by the web server. Alternatively, at operation 144, the user may choose to disconnect from the web server. If the user does not disconnect from the web server at operation 146, the browser application 42 waits for the user to select another sub-event at operation 142 until the user chooses to disconnect at operation 144.

Figure 10:
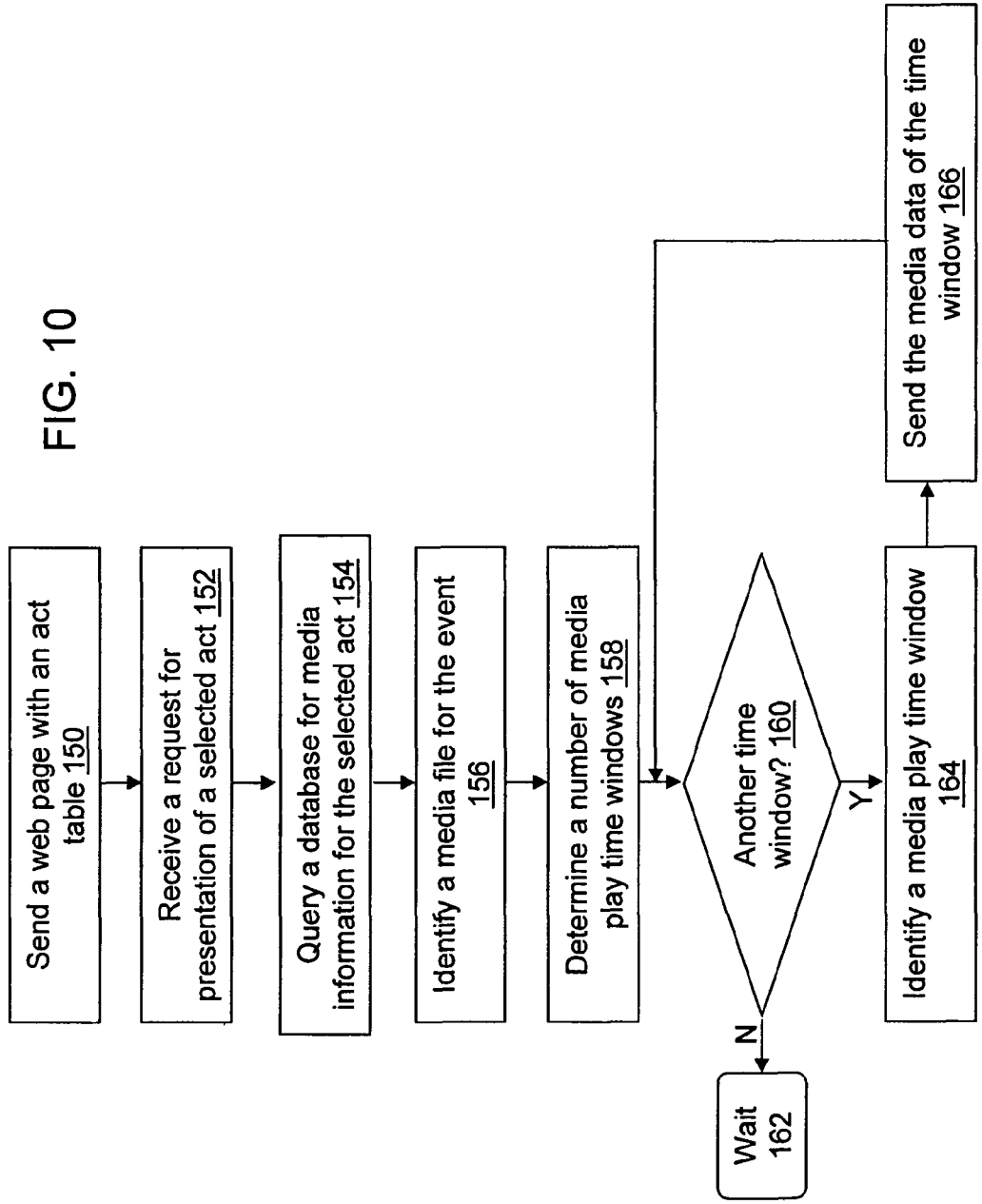
FIG. 10 is a flow diagram of sending media data associated with a selected sub-event using a web server application.

In response to the user executing the browser application 42 and selecting a website provided by a web server, the web server sends a web page with a sub-event table to the user at operation 150 referenced in FIG. 10. The web server application 62 executing at the web server, at operation 152, receives a request for presentation of a selected sub-event from the browser application 42. The request comprises sub-event information associated with the selected sub-event. The sub-event information may include, but is not limited to, the sub-event code, the sub-event performer, and the event identifier. Using the sub-event information, the web server application 62 queries a database for media data recorded of the selected sub-event at operation 154. The query may include, but is not limited to, the sub-event code, the sub-event performer, and the event identifier.

Through the query, the web server application 62 identifies a media file or media files recorded of the event at operation 156. Also through the query, the web server application 62, at operation 158, identifies a number of time windows in which media associated with the selected sub-event is contained in the media file or files. The decision at operation 160 determines if another time window of the selected sub-event exists. If no additional time windows exist, the web server application 62 waits at operation 162 for another selection by the user. If another time window of the selected sub-event exists, the web server application 62 identifies a media play time window at operation 164. The web server application 62 sends the media data corresponding to the media play time window to the browser application 42 at operation 166. Processing continues at operation 160 until all of the time windows associated with the selected sub-event have been sent.

The media data may be maintained in a single media file for the event with the media data selected from the media file relative to a selected sub-event using time window data associated with the sub-event in the database. As known to those skilled in the art, alternative embodiments exist. For example, at the conclusion of the event, individual media clips may be extracted from the media data of the entire event using the time window data. Using this alternative, the database may comprise a list of media clips that correspond to the selected sub-event instead of a list of time windows. Additionally, the media data may be recorded in a set of media files based, for example, on a particular camera view of the event.

In an alternative embodiment, the functionality described above for playing media data relative to sub-events of an event may be distributable using a CD or DVD instead of accessing the information using the browser application 42.

It is understood that the invention is not confined to the particular embodiments set forth herein as illustrative, but embraces all such modifications, combinations, and permutations as come within the scope of the following claims. The description above focused on a preferred embodiment of the invention designed to provide media data associated with a baseball box score. The present invention, however, is not limited to a particular application. The description above also focused on a preferred embodiment of the invention designed to operate on a computer system executing a Microsoft® Windows based operating system. The present invention, however, is not limited to a particular operating environment. Those skilled in the art will recognize that the system and methods of the present invention may be advantageously operated on different platforms using different operating systems including but not limited to the Macintosh® operating system, LINUX based operating systems, or UNIX® based operating systems. Additionally, the functionality described may be distributed among modules that differ in number and distribution of functionality from those described herein without deviating from the spirit of the invention. Additionally, the order of execution of the modules may be changed without deviating from the spirit of the invention. Thus, the description of the preferred embodiments is for purposes of illustration and not limitation.

What is claimed is:

1. A method of selectively presenting a portion of a baseball game to a user, the method comprising:

displaying a plurality of sub-events in a sub-event table that represent scoring information of the baseball game as a baseball box score of the baseball game within a browser application at a first computer, wherein the plurality of sub-events are configured to allow a user to select a sub-event from the plurality of sub-events associated with a sub-event performer and a sub-event code using a hyperlink, wherein the sub-event code is selected from the group consisting of an at bat, a run, a hit, a run batted in, a base on balls, a strikeout, a left on base, an earned run, a single, a double, a triple, an error, and a home run;

sending a request from the first computer to a second computer, the request comprising the sub-event code and sub-event performer associated with the selected sub-event, wherein the second computer is configured to evaluate whether there is more than one time window in which media associated with the selected sub-event is contained by identifying a media file using both the sub-event performer and the sub-event code and identifying a media play time window within the identified media file using both the sub-event performer and the sub-event code;

receiving streaming media data at the first computer until media from all time windows in which media associated with the selected sub-event is contained have been received, wherein the media data represents the selected sub-event and media associated with the selected sub-event; and decoding the received media data at the first computer with a media player executing at the first computer and presenting the selected sub-event to the user, wherein presenting the received media comprises presenting media contained in more than one time window if there is more than one time window in which media associated with the selected sub-event is contained.

2. A non-transitory computer-readable memory, including computer readable instructions which when executed by a processor cause a computer to:

display a plurality of sub-events in a sub-event table that represent scoring information of a baseball game as a baseball box score of the baseball game within a browser application, wherein at least one of the sub-events is associated with a sub-event performer and a sub-event code, wherein the sub-event code is selected from the group consisting of an at bat, a run, a hit, a run batted in, a base on balls, a strikeout, a left on base, an earned run, a single, a double, a triple, an error, and a home run;

receive a selection from a user of the at least one of the sub-events associated with a sub-event performer and a sub-event code through selection of a hyperlink;

send a request to a device, the request comprising the sub-event code and sub-event performer associated with the selected sub-event, wherein the device is configured to evaluate whether there is more than one time window in which media associated with the selected sub-event is contained by identifying a media file using both the sub-event performer and the sub-event code and identifying a media play time window within the identified media file using both the sub-event performer and the sub-event code;

receive streaming media data until media from all time windows in which media associated with the selected sub-event is contained have been received wherein the media data represents the selected sub-event and media associated with the selected sub-event; and cause a media player executing at the computer to decode the received media data and present the selected sub-event to the user, wherein presenting the received media comprises presenting media contained in more than one time window if there is more than one time window in which media associated with the selected sub-event is contained.

3. A device for selectively presenting a portion of a baseball game to a user, the device comprising:

a media player configured to present media data;

an application, the application comprising computer code configured to:

display a plurality of sub-events in a sub-event table that represent scoring information of the baseball game as a baseball box score of the baseball game within a browser application, wherein at least one of the sub-events is associated with a sub-event performer and a sub-event code, wherein the sub-event code is selected from the group consisting of an at bat, a run, a hit, a run batted in, a base on balls, a strikeout, a left on base, an earned run, a single, a double, a triple, an error, and a home run;

receive a selection from a user of the at least one of the sub-events associated with a sub-event performer and a sub-event code through selection of a hyperlink;

send a request to a second device, the request comprising the sub-event code and sub-event performer associated with the selected sub-event, wherein the second device is configured to evaluate whether there is more than one time window in which media associated with the selected sub-event is contained by identifying a media file using both the sub-event performer and the sub-event code and identifying a media play time window within the identified media file using both the sub-event performer and the sub-event code;

receive media data until media from all time windows in which media associated with the selected sub-event is contained have been received, wherein the media data represents the selected sub-event and media associated with the selected sub-event, and cause the media player to decode the received media data and present the selected sub-event to the user, wherein presenting the received media comprises presenting media contained in more than one time window if there is more than one time window in which media associated with the selected sub-event is contained;

a communication interface, the communication interface configured to provide an interface between the application and the second device;

a memory, the memory configured to store the application; and a processor, the processor coupled to the memory and configured to execute the application.

4. A system for selectively presenting a portion of a baseball game to a user, the system comprising:

a first device, the first device comprising:

a media player configured to present media data;

a first application, the first application comprising computer code configured to:

display a plurality of sub-events in a sub-event table that represent scoring information of the baseball game as a baseball box score of the baseball game within a browser application, wherein at least one of the sub-events is associated with a sub-event performer and a sub-event code, wherein the sub-event code is selected from the group consisting of an at bat, a run, a hit, a run batted in, a base on balls, a strikeout, a left on base, an earned run, a single, a double, a triple, an error, and a home run;

receive a selection from a user of the at least one of the sub-events associated with a sub-event performer and a sub-event code through selection of a hyperlink;

send a request to a second device, the request comprising the sub-event code and sub-event performer associated with the selected sub-event;

receive streaming media data until media from all time windows in which media associated with the selected sub-event is contained have been received, wherein the media data represents the selected sub-event and media associated with the selected sub-event; and cause the media player to decode the received media data and present the selected sub-event to the user, wherein presenting the received media comprises presenting media contained in more than one time window if there is more than one time window in which media associated with the selected sub-event is contained;

a first communication interface, the first communication interface configured to provide an interface between the first application and the second device;

a first memory, the first memory configured to store the first application; and a first processor, the first processor coupled to the first memory and configured to execute the first application; and the second device comprising:

a database that stores sub-event timing data relating to sub-events of the event;

a second application, the second application comprising computer code configured to:

receive the request from the first device;

query the database using both the sub-event performer and the sub-event code to identify sub-event timing data associated with the selected sub-event, and evaluate the identified sub-event timing data to determine whether there is more than one time window in which media associated with the selected sub-event is contained;

command the first device to execute the media player, wherein the media player executing at the first device decodes media data that represents the selected sub-event and media from all the time windows in which media associated with the selected sub-event is contained;

a second communication interface, the second communication interface configured to provide an interface between the second application and the first device;

a second memory, the second memory configured to store the second application; and a second processor, the second processor coupled to the second memory and the database, and configured to execute the second application.

5. A method for identifying sub-event timing data for sub-events of a baseball game using a database that stores sub-event timing data relating to sub-events of the baseball game, the method comprising:

receiving a request from a first device at a second device, wherein the first device displays a plurality of sub-events in a sub-event table that represent scoring information of the baseball game as a baseball game box score of the baseball game within a browser application, and wherein the request comprises a sub-event performer and a sub-event code associated with a selected sub-event, wherein the sub-event code is selected from the group consisting of an at bat, a run, a hit, a run batted in, a base on balls, a strikeout, a left on base, an earned run, a single, a double, a triple, an error, and a home run;

querying the database using both the sub-event performer and the sub-event code associated with the selected sub-event to identify sub-event timing data associated with the selected sub-event, and evaluating the identified sub-event timing data to determine whether there is more than one time window in which media associated with the selected sub-event is contained;

commanding the first device to execute a media player, wherein the media player executing at the first device decodes media data that represents the selected sub-event from all the time windows in which media associated with the selected sub-event is contained, wherein decoding the received media comprises presenting media contained in more than one time window if there is more than one time window in which media associated with the selected sub-event is contained.

6. A non-transitory computer-readable memory, including computer readable instructions which when executed cause a computer to:

receive a request from a first device, wherein the first device displays a plurality of sub-events in a sub-event table that represent scoring information of a baseball game as a baseball box score of the baseball game within a browser application, and wherein the request comprises a sub-event performer and a sub-event code associated with a selected sub-event, wherein the sub-event code is selected from the group consisting of an at bat, a run, a hit, a run batted in, a base on balls, a strikeout, a left on base, an earned run, a single, a double, a triple, an error, and a home run;

query a database that stores sub-event timing data relating to sub-events of the baseball game, wherein the query includes both the sub-event performer and the sub-event code associated with the selected sub-event to identify sub-event timing data associated with the selected sub-event, and evaluate the identified sub-event timing data to determine whether there is more than one time window in which media associated with the selected sub-event is contained;

command the first device to execute a media player, wherein the media player executing at the first device decodes media data that represents the selected sub-event from all the time windows in which media associated with the selected sub-event is contained, wherein decoding the received media comprises presenting media contained in more than one time window if there is more than one time window in which media associated with the selected sub-event is contained.

7. The method of claim 1, further comprising:

executing the media player within the browser application after sending the request and before receiving the streaming media.

8. The method of claim 5, further comprising:

identifying at least one time window within the identified sub-event timing data; and adding a roll-in time period and a roll out time period to the at least one identified time window.

9. The non-transitory computer memory of claim 6, further comprising instructions to cause the computer to:

identify at least one time window within the identified sub-event timing data; and add a roll-in time period and roll out time period to the at least one identified time window.

* * * * *